Jan. 3, 1933.  H. A. BALLARD  1,892,975
MOTOR VEHICLE SCREEN
Filed May 31, 1932  3 Sheets-Sheet 1
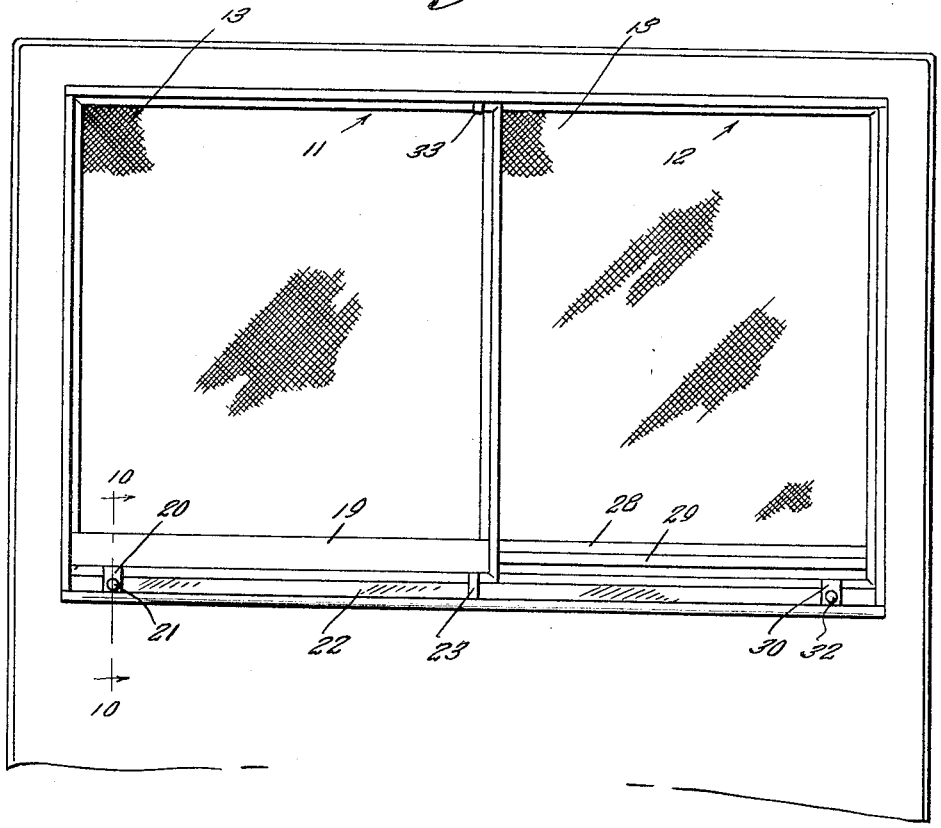
Fig. 1.
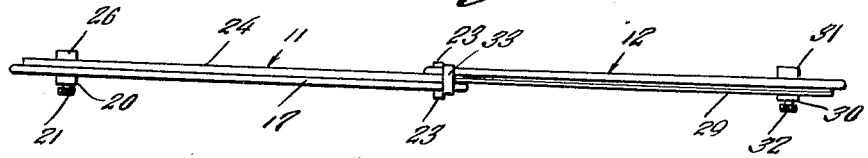
Fig. 3.
Fig. 9.
Inventor
H. A. Ballard
By Clarence A. O'Brien
Attorney Jan. 3, 1933. H. A. BALLARD 1,892,975
MOTOR VEHICLE SCREEN
Filed May 31, 1932   3 Sheets-Sheet 2
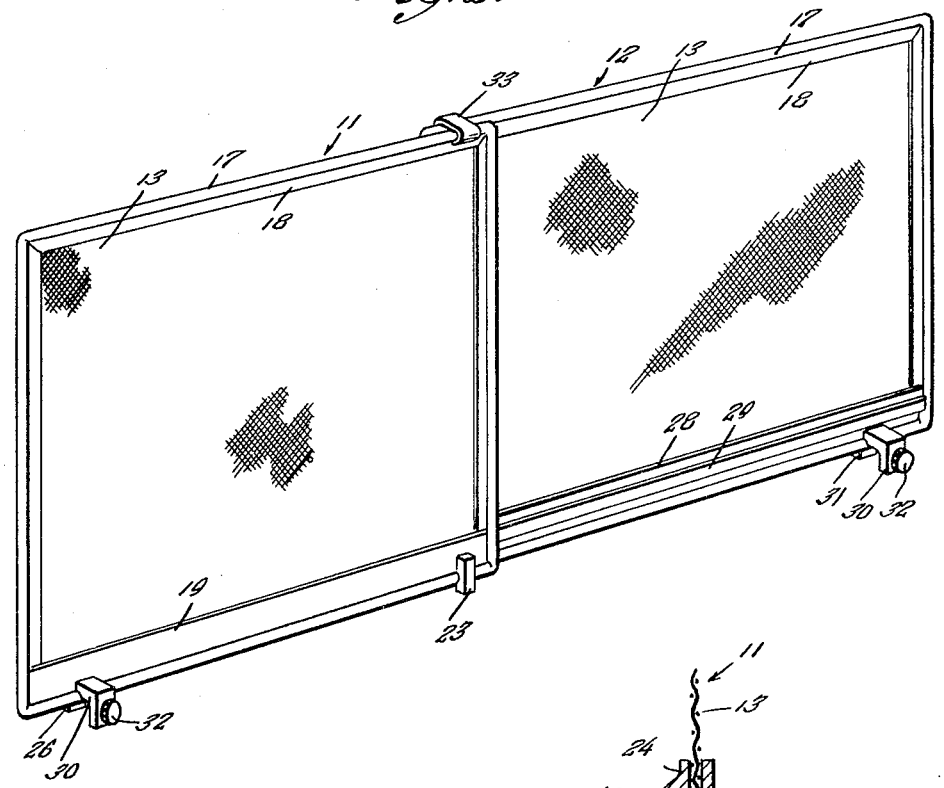
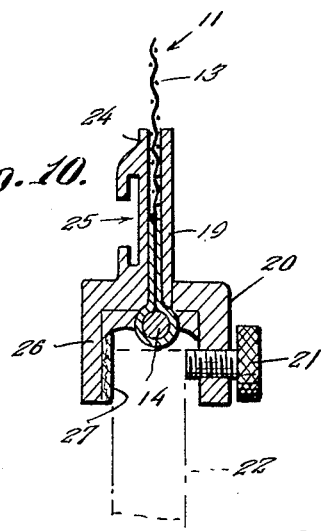
Inventor
H. A. Ballard
By Clarence A. O'Brien
Attorney

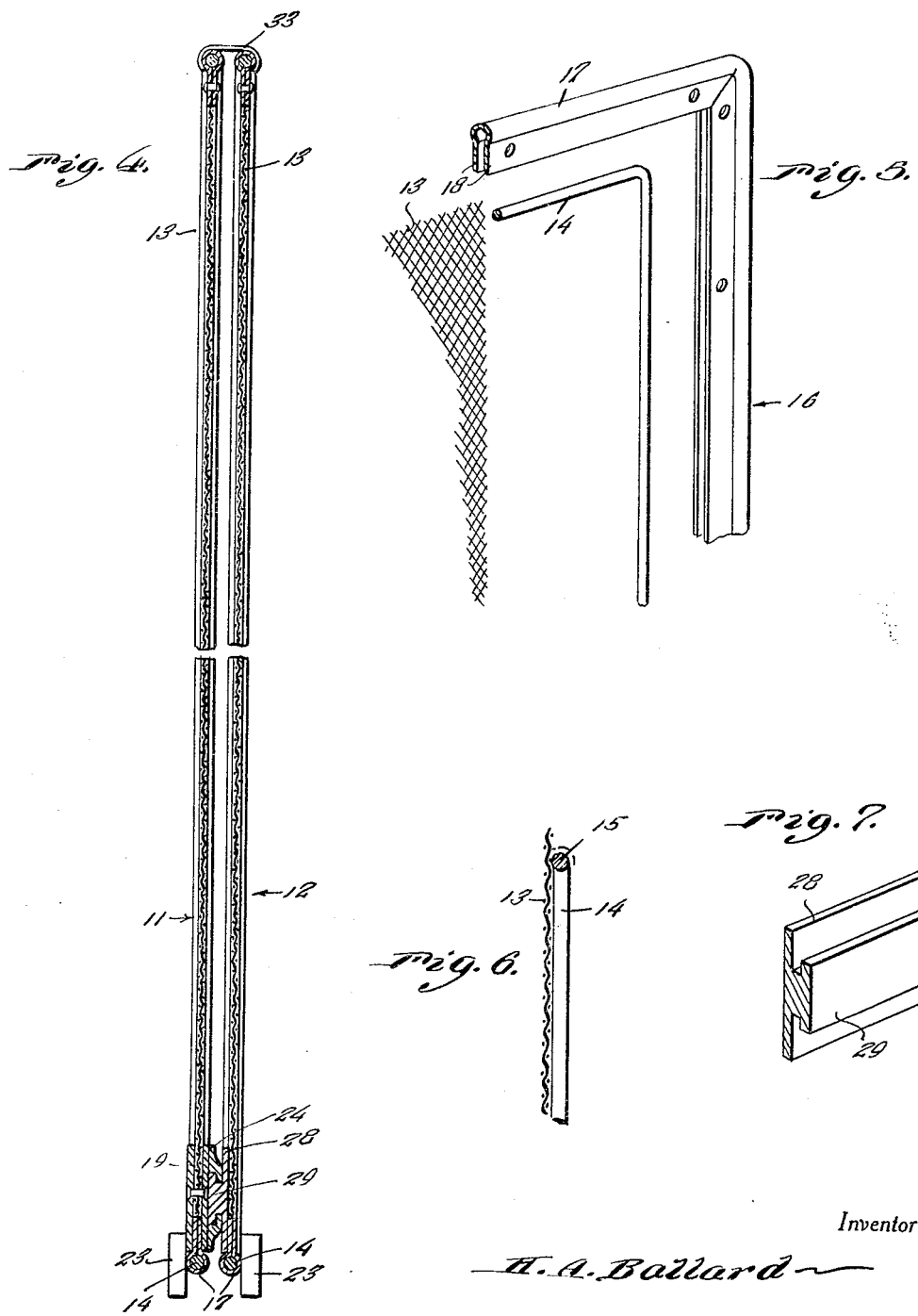

Patented Jan. 3, 1933

1,892,975

UNITED STATES PATENT OFFICE

HARRISON A. BALLARD, OF TIMBER LAKE, SOUTH DAKOTA

MOTOR VEHICLE SCREEN

Application filed May 31, 1932. Serial No. 614,543.

This invention relates to a novel and improved screen which is especially but not necessarily, adapted for use in automobile window openings.

Stated more in detail, the invention comprises an extensible sectional screen embodying companion sections especially built for intimate cooperation in providing a complete adjustable screen such as may be conveniently inserted in the window opening in order to cooperate effectively with the surrounding frame and a sliding glass panel or window.

Manifestly, the purpose of the invention is to provide a simple and economical light weight screen which is calculated to better fulfill the requirement of an accessory of this class due to its particular construction, whereby to function as an effective closure to exclude insects and extraneous matter in order to promote safe driving and greater comfort when the machine is brought to a standstill and a destination selected for recreational or camping purposes.

Other features and advantages of the invention will become more readily apparent from the following description and drawings.

In the accompanying drawings wherein like numerals are employed to designate like parts throughout the different views:

Figure 1 is an elevational view showing an automobile door and window construction with the improved screen in operative position, the screen being constructed in accordance with the principle of this invention.

Figure 2 is a perspective view of the screen removed.

Figure 3 is a top edge or plan view.

Figure 4 is an enlarged vertical sectional view through the screen.

Figure 5 is a fragmentary group perspective view illustrating the specific screen construction.

Figure 6 is a detail view showing the manner in which the screen is made up.

Figures 7 and 8 are detail perspective views,

Figure 9 is a detail view showing the method of bending the wire.

Figure 10 is a detail section on the line 10—10 of Figure 1.

As clearly represented in Figure 2 of the drawings the complete screen is made up of a pair of substantially duplicate companion sections 11 and 12 respectively. Each screen is substantially the same in specific construction. The screen wire as shown in Figures 5 and 6 is denoted by the numeral 12 and has its marginal portions bent over and around the frame rod 14 as indicated at 15. The numeral 16 in Figure 5 designates a metal sheath-like outer frame or binder which comprises a tubular portion 17 to contain the rod frame 14 and a pair of spaced parallel flanges 18 to bind the wire therebetween, rivets being used to fasten the parts together in assembled relationship.

The screen section 11 as better shown in Figures 4 and 10 has a strip of metal 19 extending across the bottom portion of the frame and soldered or otherwise secured thereto adjacent one end is a substantially L-shaped lug 20 whose lower depending leg portion is provided with a set screw 21 adapted to bind against one face of the sliding glass panel or window 22. The set screw also serves as an operating knob. Located at the opposite end of the plate or strip 19 is a block like rest 23 whose lower end terminates flush with the lower end of the lug 20 so that the two parts cooperate in forming shoes to slide along the window frame in the manner represented in Figure 1. On the opposite side of the same screen section 11 is a longitudinal plate 24 having a groove 25 defining a keyway or keeper. This plate is also provided opposite the lug 20 with a complemental L-shaped lug 26 having a felt pad or facing element 27 to bear against the opposite side of the glass window as shown in Figure 10.

The lower end of the screen section 12 is provided with a similar longitudinal plate 28 having a central longitudinal rib 29 forming a key to slide in the keyway 25 whereby to rigidly and slidably join the sections 11 and 12 rigidly together. The numerals 30 and 31 designate additional lugs carried by the section 12 and the lug 30 is formed with a binding screw 32 which functions as a knob.

It is evident that the adjacent ends of the screen sections 11 and 12 are disposed in overlapping relationship as depicted in Figure 2 and a hook-end clip 33 is rigidly connected to the upper frame portion of one of the sections and slidably connected with the corresponding portion of the companion sections in order to secure the screen sections accurately together in sliding alinement.

It is evident that the screen frames are such as to fit neatly and effectively into the usual window confining grooves in the window frame of the automobile door. The use of a pair of slidably connected extensible screen sections permits the screen, as a unit to fit different sized window openings. No vertical adjustment is necessary because the lower portions of the screen sections are clamped to the sliding window and the window is simply raised sufficiently to support the upper portion of the screen sections into the corresponding portion of the window frame to effect a tight closure. Easy adjustment is secured and maintained through the use of the lugs 20 and 30 together with the intervening block like shoe 23 all of which parts are of proper size to serve as rests to glide nicely along the lower portion of the window frame in a manner to avoid hanging at the time the screen sections are adjusted.

Three horizontally longitudinally arranged plates 19, 24 and 28 not only add to the rigidity of the construction as a whole but serves as mountings for the lugs and also provides means for effectively and slidably joining the screen sections together in overlapping adjustable relationship. This prevents one screen section sagging with respect to the other and insures that they are always in proper alinement. As an added feature the clip 33 cooperates with the key and keyway to supplement this dependable maintenance cooperation. Not only is this an advantageous arrangement because of the adjustment feature but by having the screen made up of sliding sections they may be collapsed into a comparatively small unit for convenient storage and transportation. A further feature of the novelty is predicated upon the specific construction of the screen sections themselves consisting of the inner rod frame 14 with the screen wire bound around the same, and the binding sheet or protector 16 adding to rigidity and serving as a holder for the screen and frame rod 14.

Considering the aforesaid features selectively as well as collectively it is submitted that the screen herein illustrated and described constitutes an appreciable and noteworthy contribution to the art and the trade.

It is clear that in order to use the screen properly the first thing to do is to lower the car window, then place the clamps of the screen sections on the upper edge of the sliding glass window. Then by catching a hold of the set screws 21 and 32 and using them as knobs sections may be extended longitudinally with respect to each other to fit snugly in the slide grooves in the door frame. Then the set screws are tightened slightly and the glass is raised to the requisite height to secure the screen finally in place.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to, if desired.

Having thus described my invention, what I claim as new is:

1. A sectional extensible screen comprising a pair of companion screen sections having their adjacent ends disposed in interconnecting sliding overlapping relationship, clamps fastened to the opposite ends of the lower portions of the screen sections, said clamps being adapted to engage over the upper edge of a sliding glass window, each clamp being provided with a set screw, said set screws having the additional function of knobs for adjusting the screen sections.

2. A sectional extensible screen comprising a pair of companion screen sections having their adjacent ends disposed in interconnecting sliding overlapping relationship, clamps fastened to the opposite ends of the lower portions of the screen sections, said clamps being adapted to engage over the upper edge of a sliding glass window, each clamp being provided with a set screw, said set screws having the additional function of knobs for adjusting the screen sections, the upper edge portions of the screen sections being clipped together, the lower portion of one screen section having a plate provided with a keyway, and the corresponding portion of the remaining section having a plate provided with a key slidable in said keyway.

3. In a sectional extensible screen of the class described, a pair of substantially duplicate companion screens, one screen being provided at its lower portion with a longitudinally extending plate, an L-shaped lug fastened to the plate at one end, a block like complemental rest fastened to the plate at the opposite end thereof, another longitudinal plate on the opposite side of the screen provided with a lug cooperating with the first named lug and a longitudinally grooved portion forming a keyway, a hook-end clip cooperating with the upper edge portions of the frames of the screens for holding said screens together in sliding overlapping relationship, the remaining screen being formed on its lower portion with a longitudinally extending plate having a rib constituting a key slidable in said keyway, an L-shaped lug carried by the last named plate, and set screws carried by said L-shaped lugs for the purposes described.

In testimony whereof I affix my signature.

HARRISON A. BALLARD.